United States Patent
Kwak et al.

(10) Patent No.: US 7,463,694 B2
(45) Date of Patent: Dec. 9, 2008

(54) GROUPWISE SUCCESSIVE INTERFERENCE CANCELLATION FOR BLOCK TRANSMISSION WITH RECEPTION DIVERSITY

(75) Inventors: Jaeyoung Kwak, Palisades Park, NJ (US); Jung-Lin Pan, Selden, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/897,456

(22) Filed: Aug. 30, 2007

(65) Prior Publication Data
US 2008/0019431 A1    Jan. 24, 2008

Related U.S. Application Data

(63) Continuation of application No. 10/622,306, filed on Jul. 18, 2003, now Pat. No. 7,266,168.

(60) Provisional application No. 60/397,361, filed on Jul. 19, 2002.

(51) Int. Cl.
*H04L 1/02* (2006.01)
(52) U.S. Cl. .................. 375/267; 375/348; 375/349
(58) Field of Classification Search ......... 375/260–261, 375/267, 285, 295, 316, 346–349
See application file for complete search history.

(56) References Cited

U.S. PATENT DOCUMENTS 5,202,903 A   4/1993  Okanoue
5,933,423 A   8/1999  Lasko et al.
6,212,243 B1  4/2001  Klein et al.
6,298,050 B1  10/2001 Van Heeswyk et al.

(Continued)

FOREIGN PATENT DOCUMENTS

DE        19616828        11/1997

(Continued)

OTHER PUBLICATIONS

Blanz et al., "Performance Of A Cellular Hybrid C/TDMA Mobile Radio System Applying Joint Detection And Coherent Receiver Antenna Diversity", IEEE Journal On Selected Areas In Communications, vol. 12, No. 4, pp. 568-579, (May 1994).

(Continued)

*Primary Examiner*—Khanh C Tran
(74) *Attorney, Agent, or Firm*—Volpe and Koenig, P.C.

(57) ABSTRACT

A plurality of data signals are received over an antenna array having a plurality of antenna elements. The data signals are transmitted over a shared spectrum in a wireless communication system. A signal having each of the data signals is received over each antenna element. The plurality of data signals are grouped into a plurality of groups. The received signals of the antenna elements are matched filtered for a first group of the plurality of groups, producing a matched filtered result. Data is jointly detected of the first group using the matched filtered result. An interference correction signal is constructed using the detected data for each antenna element. The interference cancelled result is subtracted from the received signal of each antenna element, producing an interference cancelled result for each antenna element. Data is successively detected for remaining groups using the interference cancelled result for each antenna element.

13 Claims, 4 Drawing Sheets

U.S. PATENT DOCUMENTS

| | | | |
|---|---|---|---|
| 6,301,470 | B1 | 10/2001 | Brunner et al. |
| 6,639,551 | B2* | 10/2003 | Li et al. .................. 342/381 |
| 6,745,050 | B1 | 6/2004 | Forsythe et al. |
| 6,834,043 | B1* | 12/2004 | Vook et al. .................. 370/310 |
| 6,898,248 | B1 | 5/2005 | Elgamal et al. |
| 7,058,146 | B2* | 6/2006 | Paulraj et al. .............. 375/347 |
| 7,116,724 | B2 | 10/2006 | You |
| 2002/0018454 | A1 | 2/2002 | Misra et al. |
| 2003/0035491 | A1 | 2/2003 | Walton et al. |
| 2003/0108117 | A1 | 6/2003 | Ketchum et al. |
| 2003/0189999 | A1* | 10/2003 | Kadous .................. 375/349 |

FOREIGN PATENT DOCUMENTS

| | | |
|---|---|---|
| JP | 2002-111537 | 4/2002 |
| JP | 2002-135165 | 5/2002 |
| WO | 0169801 | 9/2001 |

OTHER PUBLICATIONS

Golub et al., *Matrix Computations*, Third Edition, The Johns Hopkins University Press, (1996).

Hee Han et al., "Objective Function Based Group-Wise Successive Interference Cancellation Receiver For Dual-Rate DS-CDMA System", Vehicular Technology Conference, 2002., IEEE 55th, pp. 1685-1688, (May 9, 2002).

Jung et al., "Joint Detection With Coherent Receiver Antenna Diversity In CDMA Mobile Radio Systems", IEEE Transactions On Vehicular Technology, vol. 44, No. 1, pp. 76-88, (Feb. 1995).

Kaleh, "Channel Equalization For Block Transmission Systems", IEEE Journal On Selected Areas In Communications, vol. 13, No. 1, pp. 110-121, (Jan. 1995).

Karimi et al., "A Novel And Efficient Solution To Block-Based Joint-Detection Using Approximate Cholesky Factorization", Personal, Indoor And Mobile Communications PIMRC'98, Conference Proceedings, vol. 3, pp. 1340-1345, (Sep. 8-11, 1998).

Lupas et al., "Near-Far Resistance Of Multiuser Detectors In Asynchronous Channels", IEEE Transactions On Communications, vol. 38, No. 4, pp. 496-508, (Apr. 1990).

Madhow et al., "MMSE Interference Suppression For Direct-Sequence Spread-Spectrum CDMA", IEEE Transactions On Communications, vol. 42, No. 12, pp. 3178-3188, (Dec. 1994).

McDonough et al., *Detection Of Signals In Noise*, Second Edition, Academic Press, (1995).

Misra et al., "Multi-User Detection Using A Combination Of Linear Sequence Estimation And Successive Interference Cancellation", InterDigital Communications Corp., (Feb. 2000).

Moshavi, "Multi-User Detection For DS-CDMA Communications", IEEE Communications Magazine, pp. 124-136, (Oct. 1996).

Patel et al., "Analysis Of Simple Successive Interference Cancellation Scheme In A DS/CDMA System", IEEE Journal On Selected Areas In Communications, vol. 12, No. 5, pp. 796-807, (Jun. 1994).

Proakis, *Digital Communications*, Third Edition, McGraw-Hill, Inc., (1995).

Third Generation Partnership Project, "Technical Specification Group Radio Access Networks; Utra (UE) TDD; Radio Transmission And Reception 3G TS 25.102 Version 3.2.0 Release 1999", 3G TS 25.102 V3.2.0 (Mar. 2000).

Third Generation Partnership Project, "Technical Specification Group Radio Access Network; Physical Channels And Mapping Of Transport Channels Onto Physical Channels (TDD) (Release 1999)", 3G TS 25.211 V3.2.0 (Mar. 2000).

Tsatsanis et al., "Adaptive Blind Interference Cancellation in CDMA Systems", Global Telecommunications Conference, General Conference (Part A), pp. 487-491, (1999).

Varanasi et al., "Multistage Detection In Asynchronous Code-Division Multiple-Access Communications", IEEE Transactions On Communications, vol. 38, No. 4, pp. 509-519, (Apr. 1990).

Varanasi et al., "Near-Optimum Detection In Synchronous Code-Division Multiple-Access Systems", IEEE Transactions On Communications, vol. 39, No. 5, pp. 725-736, (May 1991).

Verdú, "Minimum Probability Of Error For Asynchronous Gaussian Multiple-Access Channels", IEEE Transactions On Information Theory, vol. IT-32, No. 1, pp. 85-96, (Jan. 1986).

Viterbi, "Very Low Rate Convolutional Codes For Maximum Theoretical Performance Of Spread-Spectrum Multiple-Access Channels", IEEE Journal On Selected Areas In Communications, vol. 8, No. 4, pp. 641-649, (May 1990).

Wijting et al., "Groupwise Serial Multiuser Detectors For Multirate DS-CDMA", Vehicular Technology Conference, 1999 IEEE 49th, pp. 836-840, (May 20, 1999).

Xie et al., "Family Of Suboptimum Detectors For Coherent Multiuser Communications", IEEE Journal On Selected Areas In Communications, vol. 8, No. 4, pp. 683-690, (May 1990).

Zvonar, "Combined Multiuser Detection And Diversity Reception For Wireless CDMA Systems", IEEE Transactions On Vehicular Technology, vol. 45, No. 1, pp. 205-211, (Feb. 1996).

* cited by examiner

GROUPWISE SUCCESSIVE INTERFERENCE CANCELLATION FOR BLOCK TRANSMISSION WITH RECEPTION DIVERSITY

CROSS REFERENCE TO RELATED APPLICATIONS

This application is a continuation of U.S. patent application Ser. No. 10/622,306, filed Jul. 18, 2003, which claims the benefit of U.S. Provisional Application Ser. No. 60/397,361, filed Jul. 19, 2002, which are incorporated by reference as if fully set forth.

FIELD OF INVENTION

The invention generally relates to wireless communication systems. In particular, the invention relates to joint detection of multiple user signals in a wireless communication system.

BACKGROUND

FIG. 1 is an illustration of a wireless communication system 10. The communication system 10 has base stations $12_1$ to $12_5$ which communicate with wireless transmit/receive units (WTRUs) $14_1$ to $14_3$. Each base station $12_1$ has an associated operational area where it communicates with WTRUs $14_1$ to $14_3$ in its operational area.

In some communication systems, such as code division multiple access (CDMA) and time division duplex using code division multiple access (TDD/CDMA), multiple communications are sent over the same frequency spectrum. These communications are typically differentiated by their chip code sequences. To more efficiently use the frequency spectrum, TDD/CDMA communication systems use repeating frames divided into time slots for communication. A communication sent in such a system will have one or multiple associated codes and time slots assigned to it based on the communication's bandwidth.

Since multiple communications may be sent in the same frequency spectrum and at the same time, a receiver in such a system must distinguish between the multiple communications. One approach to detecting such signals is matched filtering. In matched filtering, a communication sent with a single code is detected. Other communications are treated as interference. To detect multiple codes, a respective number of matched filters are used. Another approach is successive interference cancellation (SIC). In SIC, one communication is detected and the contribution of that communication is subtracted from the received signal for use in detecting the next communication.

In some situations, it is desirable to be able to detect multiple communications simultaneously in order to improve performance. Detecting multiple communications simultaneously is referred to as joint detection. Some joint detectors use Cholesky decomposition to perform a minimum mean square error (MMSE) detection or zero-forcing block equalizers (ZF-BLEs). Other joint detection receivers use fast Fourier transform based implementations to reduce the complexity further.

Accordingly, it is desirable to have alternate approaches to multi-user detection.

SUMMARY

A plurality of data signals are received over an antenna array having a plurality of antenna elements. The data signals are transmitted over a shared spectrum in a wireless communication system. A signal having each of the data signals is received over each antenna element. The plurality of data signals are grouped into a plurality of groups. The received signals of the antenna elements are matched filtered for a first group of the plurality of groups, producing a matched filtered result. Data is jointly detected of the first group using the matched filtered result. An interference correction signal is constructed using the detected data for each antenna element. The interference cancelled result is subtracted from the received signal of each antenna element, producing an interference cancelled result for each antenna element. Data is successively detected for remaining groups using the interference cancelled result for each antenna element.

DETAILED DESCRIPTION OF THE PREFERRED EMBODIMENTS

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

Figure 2:
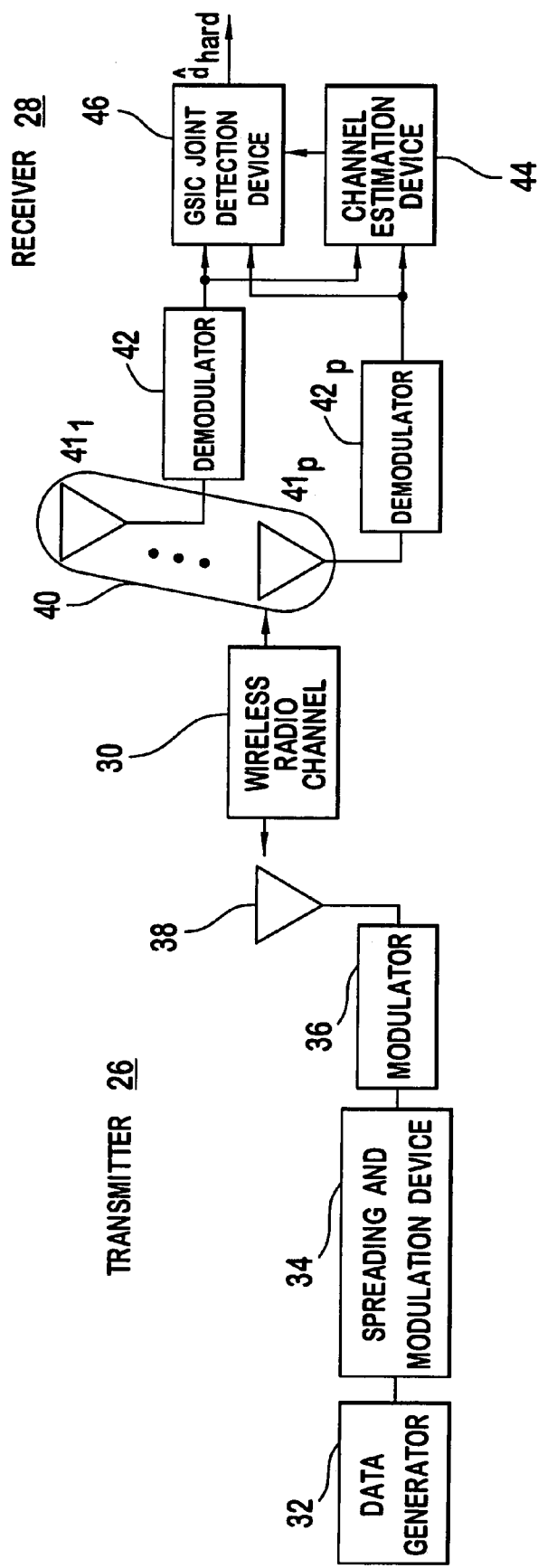
FIG. 2 is a simplified block diagram of a transmitter and a joint detection group successive interference canceller receiver having multiple antenna elements.

FIG. 2 illustrates a simplified transmitter 26 and receiver 28 using an adaptive combination of joint detection (JD) and group-wise successive interference cancellation (GSIC), "GSIC-JD", where reception diversity is used. In a typical system, a transmitter 26 is in each WTRU $14_1$ to $14_3$ and multiple transmitting circuits 26 sending multiple communications are in each base station $12_1$ to $12_5$. A base station $12_1$ will typically require at least one transmitting circuit 26 for each actively communicating WTRU $14_1$ to $14_3$. The GSIC-JD receiver 28 may be at a base station $12_1$, WTRUs $14_1$ to $14_3$ or both, although the more common implementation is at a base station, where the use of multiple antenna elements is more common. The GSIC-JD receiver 28 receives communications from multiple transmitters 26 or transmitting circuits 26.

Although GSIC-JD is described in conjunction with the preferred application to a slotted CDMA system, such as TDD/CDMA or time division synchronous CDMA (TD-SCDMA), it can be applied to any wireless system where multiple communications share the same frequency band, such as frequency division duplex (FDD)/CDMA and CDMA 2000.

Each transmitter 26 sends data over a wireless radio channel 30. A data generator 32 in the transmitter 26 generates data to be communicated over a reference channel to a receiver 28. Reference data is assigned to one or multiple codes and/or time slots based on the communications bandwidth requirements. A modulation and spreading device 34 spreads the reference data and makes the spread reference data time-multiplexed with a training sequence in the appropriate assigned time slots and codes, for slotted systems. In non-slotted systems, the reference signal may not be time-multiplexed, such as an almost continuous global pilot. The resulting sequence is referred to as a communication burst. The communication burst is modulated by a modulator 36 to radio frequency. An antenna 38 radiates the RF signal through the wireless radio channel 30 to an antenna array 40 of the receiver 28. The type of modulation used for the transmitted communication can be any of those known to those skilled in the art, such as direct phase shift keying (DPSK), quadrature phase shift keying (QPSK) or M-ary quadrature amplitude modulation (QAM).

Figure 1:
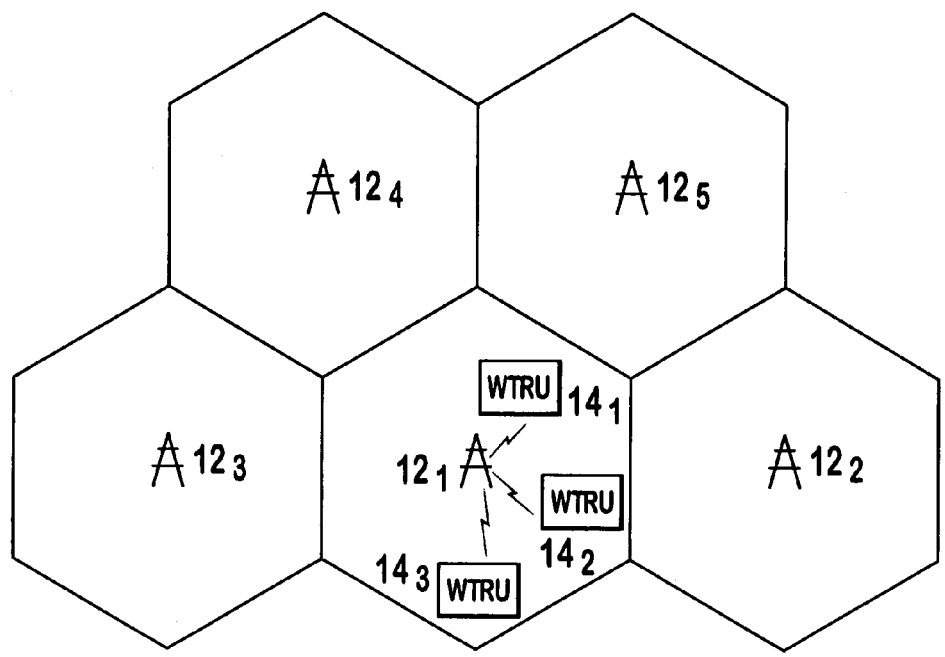
FIG. 1 is a simplified illustration of a wireless communication system.
Figure 3:
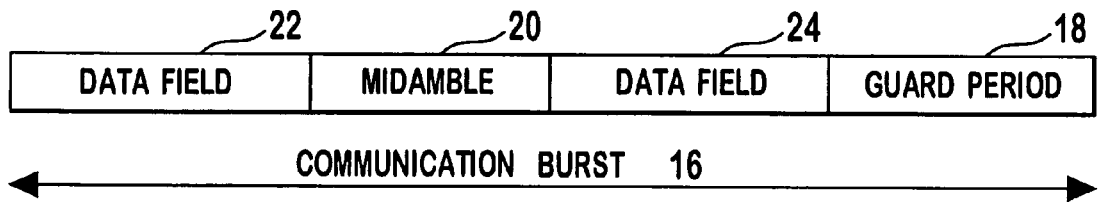
FIG. 3 is an illustration of a communication burst.

In slotted systems, a typical communication burst 16 has a midamble 20, a guard period 18 and two data fields 22, 24, as shown in FIG. 3. The midamble 20 separates the two data fields 22, 24 and the guard period 18 separates the communication bursts to allow for the difference in arrival times of bursts transmitted from different transmitters. The two data fields 22, 24 contain the communication burst's data and are typically the same symbol length. The midamble 20 contains a training sequence.

The antenna array 40 of the receiver 28 receives various radio frequency signals. The antenna array 40 has P antenna elements 41$_1$ to 41$_P$. The received signals are demodulated by demodulators 42$_1$ to 42$_P$ to produce baseband signals. The baseband signals are processed, such as by a channel estimation device 44 and a GSIC-JD device 46, in the time slots and with the appropriate codes assigned to the communication bursts of the corresponding transmitters 26. The channel estimation device 44 uses the training sequence component in the baseband signals to provide channel information, such as channel impulse responses. The channel information is used by the GSIC-JD device 46 to estimate the transmitted data of the received communication bursts as either hard or soft symbols.

Figure 4:
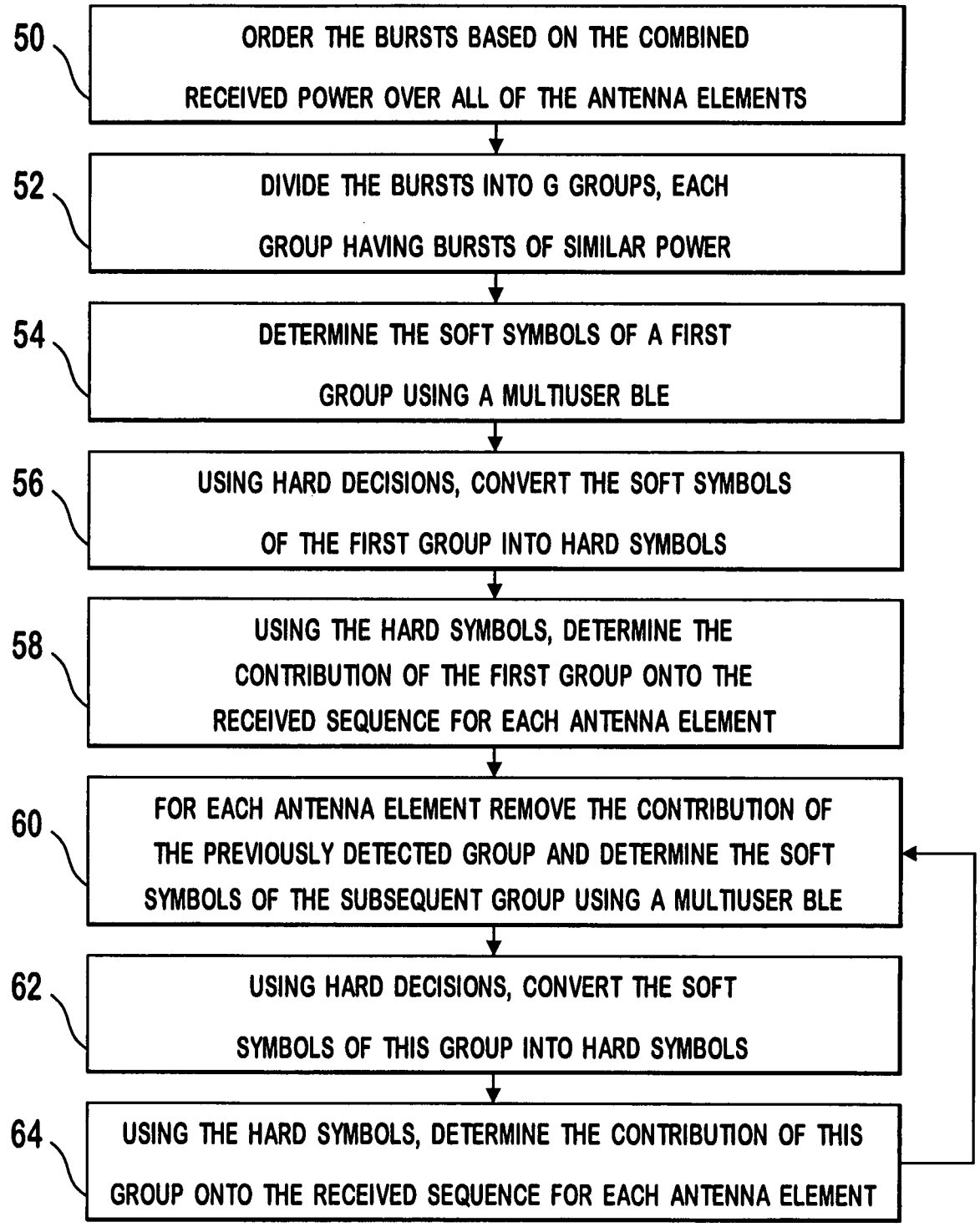
FIG. 4 is a flow chart for joint detection group successive interference canceling for a receiver having multiple antenna elements.

FIG. 4 is a simplified diagram of a GSIC-JD device 46. For the following, sequences, vectors, and matrices are in boldface and $(\bullet)^H$ denotes the complex conjugate transpose operation and $(\bullet)^T$ denotes the real transposition.

K signal bursts are simultaneously active in the same frequency band of width B. The K bursts are separated by their different codes. In a UMTS TDD/CDMA system, the codes may consist of a cell specific scrambling code and a single or multiple channelization codes. The finite transmitted data symbol sequence, $d^{(k)}$, of length N is per Equation 1.

$$d^{(k)} = d_1^{(k)} d_2^{(k)} \ldots d_N^{(k)})^T, d_n^{(k)} \in V, \qquad \text{Equation 1}$$

i. where k=1, 2, ..., K and n=1, 2, ..., N

Each data symbols $d_n^{(k)}$ has a duration $T_b$ and each data symbols $d_n^{(k)}$ is taken from a complex M-ary set, V, having M potential values per Equation 2.

$$\text{a. } V = \{v_1 v_2 \ldots v_M\} \qquad \text{Equation 2}$$

Each data symbol sequence, $d^{(k)}$, is spread by the code $c^{(k)}$. $c^{(k)}$ is per Equation 3.

$$\text{a. } c^{(k)} = (c_1^{(k)} c_2^{(k)} \ldots c_Q^{(k)})^T, \qquad \text{Equation 3}$$

where k=1, 2, ..., K and q=1, 2, ..., Q

Each code, $c^{(k)}$, consists of Q complex chips $c_q^{(k)}$ of duration $T_c$, where $T_b = T_c/Q$. Each data field of each burst is filled by a chip sequence of length N×Q. Q is the spreading factor. Although the following discussion uses a uniform spreading factor for all the K bursts, it is also readily extendable for variable spreading factors for the bursts. After modulating the data with their respective codes, the bursts are typically passed through a transmitter (TX) filter for pulse shaping. The receiving antenna array has P antenna elements.

The K signal bursts pass through K×P linearly independent radio channels having time-variant complex impulse responses, $\tilde{h}^{(k,p)}$, where k=1, 2, ..., K and p=1, 2, ..., P. $\tilde{h}^{(k,p)}$ represents the connection of a transmitter k with an antenna element p. These channel output sequences of K bursts are superposed into P received sequences at each antenna element. Each superposed sequence is filtered by the receiver (RX) filter for band limitation and noise suppression and sampled at the chip rate $1/T_c$. The discrete channel impulse responses $h^{(k,p)}$ for each transmitter and each antenna element is represented as a vector per Equation 4.

$$\text{a. } h^{(k,p)} = (h_1^{(k,p)} h_2^{(k,p)} \ldots h_W^{(k,p)})^T, \qquad \text{Equation 4}$$

b. where k=1, 2, ..., K, p=1, 2, ..., P and w=1, 2, ..., W

W is the length of the impulse response. Each of the W complex samples, $h_w^{(k,p)}$, is taken at the chip rate 1/Tc, where $W > T_b$. However, this approach can be readily extended to multiple chip rate sampling. Since W may be greater than $T_b$, inter-symbol interference (ISI) may be present. Typically, the channel impulse responses, $h^{(k,p)}$, is estimated using a reference sequence, such as a midamble sequences. The symbol responses $b^{(k,p)}$ for each burst and each antenna are per Equation 5.

$$b^{(k,p)} = (b_1^{(k,p)} b_2^{(k,p)} \ldots b_{Q+w-1}^{(k,p)})^T = h^{(k,p)} \otimes c^{(k)}, \qquad \text{Equation 5}$$

a. where k=1, 2, ..., K, p=1, 2, ..., P and l=1, 2, ..., Q+W-1

The symbol responses, $b^{(k,p)}$, have a length of Q+W-1 chips and represent the tail of chips left by a unit symbol.

Prior to processing each data field, the effect of the midamble on the data field is canceled using a midamble cancellation algorithm. At each antenna element, the received sequence, $r^{(p)}$, where p=1, 2, ..., P, is of length (NQ+W-1). Each $r^{(p)}$ is effectively a sum of the K bursts and a noise sequence per Equation 6.

$$\text{a. } n^{(p)} = (n_1^{(p)} n_2^{(p)} \ldots n_{NQ+W-1}^{(p)})^T, \qquad \text{Equation 6}$$

b. where p=1, 2, ..., P and i=1, 2, ..., (NQ+W-1)

The zero mean and covariance matrix is per Equation 7.

$$R_n^{(p)(p)} = E\{n^{(p)} n^{(p)H}\}, \qquad \text{Equation 7}$$

where p=1, 2, ..., P

The transfer system matrix for each burst as received over each antenna element is $A^{(k,p)}$ and is of size (NQ+W-1)×N. The transfer system matrix, $A^{(k,p)}$, is a convolution of the transmitted burst with the channel response, $h^{(k,p)}$. Each element of the transfer system matrix, $(A_{Ij}^{(k,p)})$, is per Equation 8.

$$\text{a. } A^{(k,p)} = (A_{ij}^{(k,p)}), \text{ where } k = 1, 2, \ldots, K, p = 1, 2, \ldots, P, \qquad \text{Equation 8}$$

b. $i = 1, 2, \ldots, (NQ+W-1)$ and $j = 1, 2, \ldots, N$ c. where $A_{Q(n-1)+l,n}^{(k,p)} = \begin{cases} b_l^{(k,p)} & \text{for } k = 1, 2, \ldots, K \\ & p = 1, 2, \ldots, P \\ & l = 1, 2, \ldots, Q+W-1 \\ & n = 1, 2, \ldots, N \\ 0 & \text{otherwise} \end{cases}$ The (NQ+W-1)×KN transfer system matrix $A^{(p)}$ for antenna p is per Equation 9.

$$\text{a. } A^{(p)} = [A^{(1,p)} A^{(2,p)} \ldots A^{(K,p)}], \qquad \text{Equation 9}$$

where k=1, 2, ..., K and p=1, 2, ..., P

The P $(NQ+W-1) \times N$ transfer system matrix $A^{(k)}$ for burst k is per Equation 10.

$$A^{(k)} = \left[ A^{(k,1)T} A^{(k,2)T} \cdots A^{(k,P)T} \right]^T, \quad \text{Equation 10}$$

where $k = 1, 2, \ldots, K$ and $p = 1, 2, \ldots, P$

The received sequence $r^{(p)}$ at antenna p is per Equation 11.

$$r^{(p)} = \left( r_1^{(p)} r_2^{(p)} \cdots r_{NQ+W-1}^{(p)} \right)^T \quad \text{Equation 11}$$

$$= A^{(p)} d + n^{(p)} = \sum_{k=1}^{K} A^{(k,p)} d^{(k)} + n^{(p)}$$

The overall data symbol vector is per Equation 12.

$$d = \left( d^{(1)T} d^{(2)T} \cdots d^{(k)T} \right)^T \quad \text{Equation 12}$$

$$= (d_1 d_2 \cdots d_{KN})^T$$

The components of d are per Equation 13.

$$d_{N(K-1)+n} = d_n^{(k)}, \quad \text{Equation 13}$$

where $k=1, 2, \ldots, K$ and $n=1, 2, \ldots, N$.

The P $(NQ+W-1) \times KN$ overall transfer system matrix A is per Equation 14.

$$a. \quad A = \left( A^{(1)T} A^{(2)T} \cdots A^{(P)T} \right)^T \quad \text{Equation 14}$$

The overall noise vector n is per Equation 15.

$$n = \left( n^{(1)T} n^{(2)T} \cdots n^{(P)T} \right)^T \quad \text{Equation 15}$$

$$= (n_1 n_2 \cdots n_{P(NQ+W-1)})^T$$

The components of n are per Equation 16.

$$n_{(NQ+W-1)(P-1)+i} = n_i^{(p)}, \quad \text{Equation 16}$$

where $p=1, 2, \ldots, P$ and $i=1, 2, \ldots, (NQ+W-1)$

The covariance matrix of the total noise vector n is per Equation 17.

$$R_n = E\{nn^H\} \quad \text{Equation 17}$$

$$= \begin{bmatrix} R_n^{(1)(1)} & R_n^{(1)(2)} & \cdots & R_n^{(1)(P)} \\ R_n^{(2)(1)} & R_n^{(2)(2)} & \cdots & R_n^{(2)(P)} \\ \vdots & \vdots & \ddots & \vdots \\ R_n^{(P)(1)} & R_n^{(P)(2)} & \cdots & R_n^{(P)(P)} \end{bmatrix}$$

a. where $R_n^{(i)(j)} = E\{n^{(i)} n^{(j)H}\}$, where $i = 1, 2, \ldots, P$ and $j = 1, 2, \ldots, P$ The overall received sequence is represented per Equation 18.

$$r = \left( r^{(1)T} r^{(2)T} \cdots r^{(P)T} \right)^T \quad \text{Equation 18}$$

$$= (r_1 r_2 \cdots r_{P(NQ+W-1)})^T$$

$$= Ad + n$$

The components of r are per Equation 19.

$$r_{(NQ+W-1)(P-1)+i} = r_i^{(P)}, \quad \text{Equation 19}$$

where $p=1, 2, \ldots, P$ and $i=1, 2, \ldots, (NQ+W-1)$

The overall received sequence r is per Equation 20.

$$r = \sum_{k=1}^{K} r^{(k)} + n \quad \text{Equation 20}$$

$$= \sum_{k=1}^{K} A^{(k)} d^{(k)} + n$$

$r^{(k)} = A^{(k)} d^{(k)}$ represents the contribution of user k's signal in the received sequence. The overall received vector r is preferably processed by a GSIC using the block linear equalizer in order to determine the continuous valued estimates $\hat{d}$, per Equation 21.

$$\hat{d} = \left( \hat{d}^{(1)T} \hat{d}^{(2)T} \cdots \hat{d}^{(K)T} \right)^T \quad \text{Equation 21}$$

$$= (\hat{d}_1 \hat{d}_2 \cdots \hat{d}_{KN})^T$$

Two approaches to using GSIC use block linear equalizers with reception diversity, although others may be used. One approach uses a zero forcing (ZF) criterion and another uses a minimum mean squared error (MMSE) criterion.

For the following, the additive noise is assumed to be spatially and temporally white and the covariance matrix of the overall noise vector is $R_n = \sigma^2 I$. $\sigma^2$ is the variance of the additive noise and I is the identity matrix with size $KN \times KN$. With reception diversity, the ZF-BLE can be derived by minimizing the quadratic cost function $J(\hat{d}_{ZF})$, per Equation 22.

$$J(\hat{d}_{ZF}) = (r - A\hat{d}_{ZF})^H (r - A\hat{d}_{ZF}) \quad \text{Equation 22}$$

$\hat{d}_{ZF}$ is the continuous valued estimates of d and "$-1$" denotes the matrix inverse. The minimum of $J((\hat{d}_{ZF})$ leads to the continuous valued and unbiased estimate $\hat{d}_{ZF}$, per Equation 23.

$$\hat{d}_{ZF} = (A^H A)^{-1} A^H r \quad \text{Equation 23}$$

$$= d + (A^H A)^{-1} A^H n$$

The MMSE-BLE minimizes the quadratic cost function $J(\hat{d}_{MMSE})$, per Equation 24.

$$J(\hat{d}_{MMSE}) = E\{(\hat{d}_{MMSE} - d)^H (\hat{d}_{MMSE} - d)\} \quad \text{Equation 24}$$

$\hat{d}_{MMSE}$ is the continuous valued estimates of $\hat{d}$. With the covariance matrix of data symbols $R_d E\{dd^H\} = I$ and the covariance matrix of the overall background noise vector $R_n = \sigma^2 I$, the minimum of $J(\hat{d}_{MMSE})$ leads to the continuous valued estimate $\hat{d}_{MMSE}$, per Equation 25.

$$\hat{d}_{MMSE} = (A^H A + \sigma^2 I)^{-1} A^H r \qquad \text{Equation 25}$$

I denotes the K N×K N identity matrix. Since $A^H A$ is a banded block Toeplitz matrix, one approach to solve for the data vector uses an approximate Cholesky formulation. The Cholesky formulation reduces the complexity with negligible loss in performance as compared to an exact solution.

Preferably, to reduce the complexity and to remove ISI and multiple access interference (MAI), simultaneously, BLEs and GSIC are combined (GSIC-BLE). In GSIC-BLE, K bursts are divided into a small group, preferably, according to the received power. Typically, bursts having roughly same received power get grouped together. Bursts of roughly the same power are bursts that have a combined power as received over the P antenna elements of equivalent power.

In each interference cancellation stage, GSIC-BLE considers the ISI and MAI of only a subset (group) of the K bursts, and jointly detects the data symbols of this group. The detected symbols of this group are used to generate MAI that this group imparts on the other groups for subsequent stages. This MAI is removed using interference cancellation. If the group size is chosen to be K, the GSIC-BLE becomes a single user BLE. All of the data is determined in one step.

As a result, the grouping threshold provides a trade-off between complexity and performance. In the extreme, each K burst can be assigned its own stage. This approach provides the lowest complexity. Conversely, all K bursts can be assigned to a single stage, having the highest complexity.

FIG. 4 is a flow chart of GSIC-BLE with reception diversity. In GSIC-BLE with reception diversity, preferably, all bursts are ordered by the strength of their received power or amplitude, with burst 1 being the strongest, step 50. Such an ordering can be based upon either an apriori knowledge at the receiver or by other estimation schemes commonly employed in the context of SIC or MUD receivers, such as burst-specific channel estimation from a burst-specific training sequence, bank of matched filters, etc. In one implementation, using the known channel, the descending order can be decided per Equation 25.

$$\sum_{p=1}^{P} h^{(k,p)H} h^{(k,p)}, \text{ where } k = 1, 2, \ldots, K \qquad \text{Equation 25}$$

Using the list of order, GSIC-BLE divides bursts that have roughly the same power, i.e., within a certain threshold of each other, into G groups, step 52. The groups are arranged in descending order of their received power. The order can be represented as $i = 1 \ldots G$. $n_i$ is the number of bursts in the $i^{th}$ group, such as $$\sum_{i=1}^{G} n_i = K.$$

The receiver consists of G stages. Initially, a joint detection is started with group, i=1.

For each group, one groupwise BLE matrix is per Equation 26 for a ZF-BLE.

$$M_{g,ZF}^{(i)} = (A_g^{(i)H} A_g^{(i)})^{-1} A_g^{(i)H}, \qquad \text{Equation 26}$$

where $i = 1, 2, \ldots, G$

The second groupwise BLE matrix is per Equation 27 for MMSE-BLE.

$$M_{g,MMSE}^{(i)} = \left(A_g^{(i)H} A_g^{(i)} + \sigma^2 I_N\right)^{-1} A_g^{(i)H}, \text{ where } i = 1, 2, \ldots, G \qquad \text{Equation 27}$$

$$= W_g^{(i)} M_{g,ZF}^{(i)}$$

The wiener estimator of the $i^{th}$ group, $W_g^{(i)}$, $i = 1 \ldots G$, is per Equation 28.

$$W_g^{(i)} = \left(I_N + \sigma_g^2 \left(A_g^{(i)H} A_g^{(i)}\right)^{-1}\right)^{-1} \qquad \text{Equation 28}$$

$I_N$ is identity matrix of size N×N where N is the number of symbols in each data field of each burst.

In the first stage, the transfer system matrix of the first group $A_g^{(1)}$ is determined. $A_g^{(1)}$ is akin to the overall transfer system matrix A, except that it only contains the symbol responses corresponding to bursts in the first group. In the first stage, the input sequence for the group 1 is given by the overall received sequence per Equation 29.

$$x_g^{(1)} = r \qquad \text{Equation 29}$$

To remove the ISI, MAI, and the near-far effect of bursts in the first group, a multiuser BLE (ZF-BLE or MMSE-BLE) with $A_g^{(1)}$ is performed. The soft decision symbols for the group 1 $d_{g,soft}^{(1)}$ are obtained per Equation 30, step 54.

$$d_{g,soft}^{(1)} = M_g^{(1)} r \qquad \text{Equation 30}$$

where $M_g^{(i)}$, $i = 1, 2, \ldots, G$, can be either $M_{g,ZF}^{(i)}$ or $M_{g,MMSE}^{(i)}$.

$d_{g,soft}^{(1)}$ is a continuous valued estimator of $d_g^{(i)}$ that represents the sequence of information bearing symbols carried by all bursts in the first group. Based on $\hat{d}_{g,soft}^{(1)}$, hard decisions are performed to form $\hat{d}_{g,hard}^{(1)}$, step 56. Using the hard decision variable $\hat{d}_{g,soft}^{(1)}$, the contribution $\hat{r}_g^{(1)}$ of the first group to r is estimated per Equation 31, step 58.

$$\hat{r}_g^{(1)} = \begin{bmatrix} \hat{r}_g^{(1,1)T} & \hat{r}_g^{(1,2)T} & \ldots & \hat{r}_g^{(1,P)T} \end{bmatrix}^T \qquad \text{Equation 31}$$

$$= A_g^{(1)} \hat{d}_{g,hard}^{(1)}$$

$\hat{r}_g^{(1,p)}$ $p = 1, 2, \ldots, P$, is the contribution of the first group to the received sequence at antenna p. For the second stage, the interference-corrected input sequence is obtained by canceling out this MAI from the overall received sequence, per Equation 32.

$$x_g^{(2)} = \begin{bmatrix} \hat{r}_g^{(2,1)T} & \hat{r}_g^{(2,2)T} & \ldots & \hat{r}_g^{(2,P)T} \end{bmatrix}^T \qquad \text{Equation 32}$$

$$= x_g^{(1)} - \hat{r}_g^{(1)}$$

$$= (I_g - \Phi_g^{(1)}) r$$

$\Phi_g^{(i)}$ is per Equation 33 for a ZF-BLE.

$$\Phi_g^{(i)} = A_g^{(i)} (A_g^{(i)H} A_g^{(i)})^{-1} A_g^{(i)H} \qquad \text{Equation 33}$$

$\Phi_g^{(i)}$ is per Equation 34 for a MMSE-BLE.

$$\Phi_g^{(i)} = A_g^{(i)} (A_g^{(i)H} A_g^{(i)} + \sigma^2 I)^{-1} A_g^{(i)H} \qquad \text{Equation 34}$$

$I_g$ is an identity matrix of size (NQ+W−1)×(NQ+W−1). $\tilde{r}_g^{(2,p)}$ is a new interference-corrected input sequence for antenna p by subtracting $\hat{r}_g^{(1,p)}$ from the interference-corrected vector $\tilde{r}_g^{(1,p)}$ of the first stage input sequence for antenna p (the received sequence at antenna p)

For subsequent stages, such as an $i^{th}$ stage, a new interference-corrected input sequence is determined by subtracting the MAI of the previous group from the interference-corrected input sequence of the previous stage, $x_g^{(i-1)}$, per Equation 35.

$$x_g^{(i)} = x_g^{(i-1)} - \hat{r}_g^{(i-1)}$$
$$= (I_g - \Phi_g^{(i-1)})x_g^{(i-1)}$$
$$= \left[\prod_{j=1}^{i-1}(I_g - \Phi_g^{(j)})\right]r \qquad \text{Equation 35}$$

The product matrices are per Equation 36.

$$\prod_{j=a}^{b} X_i = \begin{cases} X_b \; X_{b-1} \; \ldots \; X_{a+1} \; X_a, & \text{if } a \le b \\ I & \text{if } a > b \end{cases} \qquad \text{Equation 36}$$

Similar to the first stage, $x_g^{(i)}$ consists of $\tilde{r}^{(i,p)}$, p=1, 2, ..., P for each antenna. Single user or multiuser BLE is performed to get rid of the MAI, ISI and the near-far problem of the $i^{th}$ group itself. The soft decision symbols are represented as per Equation 37, step 60.

$$\hat{d}_{g,soft}^{(i)} = M_g^{(i)} x_g^{(i)} \qquad \text{Equation 37}$$

Using the soft decision symbols, hard decision symbols $\hat{d}_{g,hard}^{(i)}$ are produced by making hard decisions, step 62. The hard symbols are used to generate the contribution $\hat{r}_g^{(i)}$ of the $i^{th}$ group in r, per Equation 38, step 64.

$$\hat{r}_g^{(i)} = A_g^{(i)} \hat{d}_{g,soft}^{(i)} \qquad \text{Equation 38}$$

Similar to the first stage, $\hat{r}_g^{(i)}$ consists of $\hat{r}_g^{(i,p)}$, p=1, 2, ..., P for each antenna. For the next stage, the interference-corrected input sequence is obtained by subtracting this MAI from the $i^{th}$ input sequence, as per Equation 39, step 66.

$$x_g^{(i+1)} = x_g^{(i)} - \hat{r}_g^{(i)}$$
$$= \left[\prod_{j=1}^{i}(I_g - \Phi_g^{(j)})\right]r \qquad \text{Equation 39}$$

In the last stage, the input sequence becomes Equation 40.

$$x_g^{(G)} = x_g^{(G-1)} - \hat{r}_g^{(G-1)}$$
$$= \left[\prod_{j=1}^{G-1}(I_g - \Phi_g^{(j)})\right]r \qquad \text{Equation 40}$$

By performing single or multiuser BLE, the soft decision symbol is obtained as per Equation 41.

$$\hat{d}_{g,soft}^{(G)} = M_g^{(G)} x_g^{(G)} \qquad \text{Equation 41}$$

The hard decision symbols $\hat{d}_{g,hard}^{(G)}$ of the final stage are obtained from these soft decision symbols using hard decisions. By considering each stage as a linear filtering of the received sequence, the linear filter $e_{(g)}^{(i)}$, i=1 ... G for each stage is per Equation 42.

$$e_g^{(i)} = \left[\prod_{j=1}^{i-1}(I - \Phi_g^{(j)})\right]^H M_g^{(i)H} \qquad \text{Equation 42}$$

The soft decision symbol at each stage is per Equation 43.

$$\hat{d}_{g,soft}^{(i)} = M_g^{(i)}\left[\prod_{j=1}^{i-1}(I - \Phi_g^{(j)})\right]r \qquad \text{Equation 43}$$
$$= e_g^{(i)H} r$$
$$= \text{diag}(e_g^{(i)H} A)d + \overline{\text{diag}}(e_g^{(i)H} A)d + e_g^{(i)H} n$$

diag(X) represents a diagonal matrix containing only the diagonal elements of the matrix X. $\overline{\text{diag}}$(X) represents a matrix with zero diagonal elements, containing all but the diagonal elements of X.

In Equation 43, the first term represents the desired symbols of the $i^{th}$ group, the second term represents the ISI and MAI term of the $i^{th}$ group, and the last term is the background noise term at the output of the $i^{th}$ stage. The first term is a vector whose $j^{th}$ component is the $j^{th}$ component of the transmitted data symbol vector of the $i^{th}$ group $d_g^{(i)}$, multiplied by a scalar. The second term due to the MAI and ISI is a vector whose $j^{th}$ component is a weighted sum of all other transmitted symbols in the overall transmitted data symbol vector d. The correlation of the background noise term is given by its covariance matrix $e_g^{(i)H} R_n e_g^{(i)}$, where $R_n$ is the covariance of the additive noise in the overall received sequence. The SINR (Signal to Interference and Noise Ratio) per data symbol at the output of each stage is per Equation 44.

$$\gamma_n^{(k)} = \frac{E\{|d_n^{(k)}|^2\}([F_g^{(i)}]_{j,j})^2}{[F_g^{(i)} R_d F_g^{(i)H}]_{j,j} - 2\text{Re}\{[F_g^{(i)} R_d]_{j,j}\}[F_g^{(i)}]_{j,j} +} \qquad \text{Equation 44}$$
$$E\{|d_n^{(k)}|^2\}([F_g^{(i)}]_{j,j})^2 + [e_g^{(i)} R_n e_g^{(i)H}]_{j,j}$$

a. where $F_g^{(i)} = e_g^{(i)H} A$ b. $j = n + N(k-1), \quad i = 1, 2, \ldots, G,$
$k = 1, 2, \ldots n_i, \quad n = 1, 2, \ldots, N$ Re{ } denotes the real part. $[X]_{j,j}$ denotes the element in the $j^{th}$ row and the $j^{th}$ column of the matrix X. $R_d = E\{dd^H\}$ is the covariance matrix of d.

In simulations, full BLEs FBLEs (BLEs having only a single stage) show better performance than GSIC-BLEs. When considering the coding gain for a 1% to 10% uncoded Bit Error Rate (BER), the performance of GSIC-BLE is close to the FBLEs.

The GSIC-BLE is also suited for the multi-code scenario where some or all users transmit multiple codes. Multi-codes from the same user can be grouped together and multiuser BLE is performed on each group. The MAI between groups is canceled by SIC. GSIC-BLE achieves better performance than conventional SIC in two ways. First, unlike conventional SIC, it maintains performance in the absence of a near-far effect by performing multiuser BLE of bursts received with similar power. Second, unlike conventional RAKE-based SIC receivers, it better accounts for the ISI of each burst via multiuser BLE of each group. The optimal mitigation of ISI leads to a more effective cancellation of MAI between groups, especially in channels with large delay spreads.

GSIC-BLE typically achieves a complexity that varies linearly with the number of bursts, K, which is substantially less than that of FBLE. Since this case accounts for the ISI in each burst, it potentially leads to a better performance than SIC receivers based on a RAKE. This performance advantage increases in channels with large delay spreads, i.e., when the ISI is significant. Even for large delay spread channels, a near-far effect of the order of 0 to 2 dB between bursts appears to be enough to achieve a performance comparable to FBLE.

Figure 5:
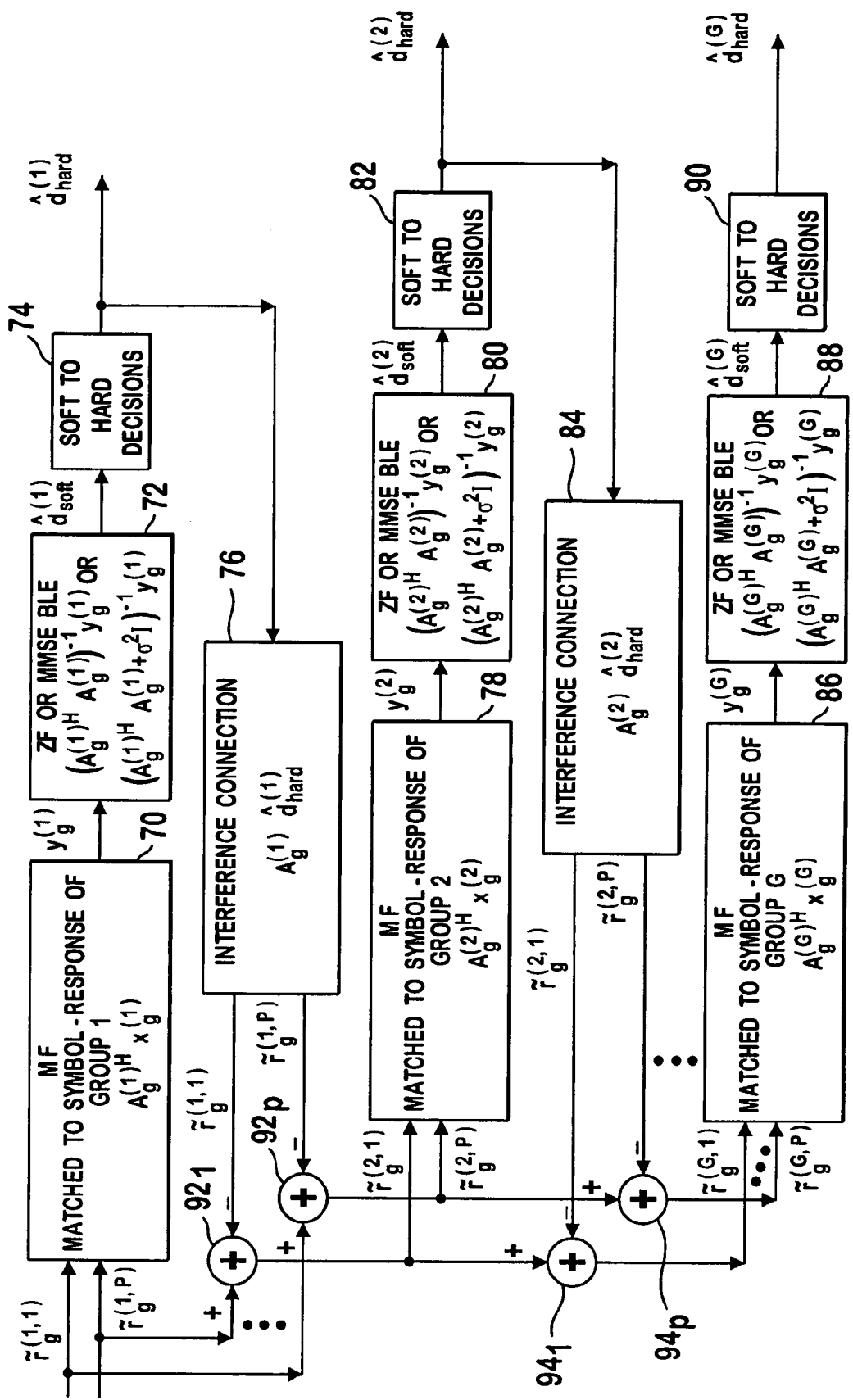
FIG. 5 is a simplified block diagram of a joint detection group successive interference canceller.

FIG. 5 is a simplified block diagram of a GSIC-BLE for use with receive diversity. The received vector, $\tilde{r}_g^{(1,1)}$ to $\tilde{r}^{(1,P)}$, from each of the P antenna elements are input into the GSIC-BLE. A group 1 matched filter 70 match filters, $A_g^{(1)H} x_g^{(1)}$, the received vectors for group 1. A result of the matched filtering, $y_g^{(1)}$, is processed by a BLE, such as a ZF, $(A_g^{(1)H} A_g^{(1)})^{-1} y_g^{(1)}$, or MMSE, $(A_g^{(1)H} A_g^{(1)} + \sigma^2 I)^{-1} y_g^{(1)}$. A result of the BLE 72, $\hat{d}_{soft}^{(1)}$, is converted to hard symbols, $\hat{d}_{hard}^{(1)}$ by a soft to hard decision device 74. An interference correction device 76 uses the hard symbols, $\hat{d}_{hard}^{(1)}$ to produce a vector, $\hat{r}_g^{(1,1)}$ to $\hat{r}_g^{(1,P)}$, for each antenna representing the contribution of group 1 to that antenna's received vector. For each antenna, a subtractor $92_1$ to $92_P$ subtracts the contribution from group 1, $\hat{r}_g^{(1,1)}$ to $\hat{r}_g^{(1,P)}$, from the received vectors, $\tilde{r}_g^{(1,1)}$ to $\tilde{r}_g^{(1,P)}$, to produce an interference cancelled vector, $\tilde{r}_g^{(2,1)}$ to $\tilde{r}^{(2,P)}$, for each antenna.

A group 2 matched filter 78 match filters, $A_g^{(2)H} x_g^{(2)}$, the interference cancelled vectors. A result of the matched filtering, $y_g^{(2)}$, is processed by a BLE 80, such as a ZF, $(A_g^{(2)H} A_g^{(2)})^{-1} y_g^{(2)}$, or MMSE, $(A_g^{(2)H} A_g^{(2)} + \sigma^2 I)^{-1} y_g^{(2)}$. A result of the BLE, $\hat{d}_{soft}^{(2)}$, is converted to hard symbols, $\hat{d}_{hard}^{(2)}$, by a soft to hard decision device 82. An interference correction device 84 uses the hard symbols, $\hat{d}_{hard}^{(2)}$, to produce a vector, $\hat{r}_g^{(2,1)}$ to $\hat{r}_g^{(2,P)}$ for each antenna representing the contribution of group 2 to that antenna's received vector. For each antenna, a subtractor $94_1$ to $94_P$ subtracts the contribution from group 2, $\hat{r}_g^{(2,1)}$ to $\hat{r}^{(2,P)}$, from the received vectors, $\tilde{r}_g^{(2,1)}$ to $\hat{r}_g^{(2,P)}$, to produce an interference cancelled vector, $\tilde{r}_g^{(3,1)}$ to $\tilde{r}^{(3,P)}$, for each antenna.

The estimation of data for the remaining groups, groups 3 to G−1, and interference cancellation is successively performed until the final group G. For group G, a group G matched filter 86 match filters, $A_g^{(G)H} x_g^{(G)}$, the interference cancelled vectors. A result of the matched filtering, $y_g^{(G)}$, is processed by a BLE 88, such as a ZF, $(A_g^{(G)H} A_g^{(G)})^{-1} y_g^{(G)}$, or MMSE, $(A_g^{(G)H} A_g^{(G)} + \sigma^2 I)^{-1} y_g^{(G)}$. A result of the BLE, $\hat{d}_{soft}^{(G)}$, is converted to hard symbols, $\hat{d}_{hard}^{(G)}$, by a soft to hard decision device 90.

What is claimed is:

1. An apparatus for transmitting and receiving a plurality of data signals using an antenna array, the apparatus comprising:
   a transmitter configured to transmit a plurality of data signals over a shared spectrum;
   a receiver configured to receive a radio frequency (RF) signal, the receiver comprising:
      an antenna array having a plurality of antenna elements,
      a plurality of demodulators,
      a channel estimation device configured to provide channel information,
      a group wise successive interference cancellation joint detection device (GSJC-JD), for estimating the transmitted reference data signals as either hard or soft symbols, configured to:
         group the plurality of transmitted data signals into a plurality of groups,
         match filter the plurality of transmitted data signals of the antenna array for a first group of the plurality of groups, producing a match filtered result,
         jointly detect data of the first group using the match filtered result,
         construct an interference correction signal using the detected data for each antenna element,
         subtract the received signal of each antenna element the interference correction signal for that element, producing an interference cancelled result for each antenna element,
         successively detect data of remaining groups using the interference cancelled result for each antenna element, wherein the jointly detecting data produces soft symbols, and
         convert the produced soft symbols into hard symbols prior to the interference correction signal construction.

2. The apparatus of claim 1 wherein the transmitter further comprises:
   a data generator configured to generate reference data signals to communicate over a reference channel;
   a spreading and modulation device configured to generate reference data into a communication burst;
   a modulator configured to modulate the communication burst into a radio frequency (RF) signal; and
   an antenna configured to radiate the RF signal through a wireless radio channel to a receiver.

3. The apparatus of claim 1 wherein:
   each of the plurality of demodulators corresponds to one of the plurality of antenna elements; and
   each demodulator is configured to demodulate the RF signal received by the corresponding one of the plurality of antenna elements to produce baseband signals.

4. The apparatus of claim 1 wherein the channel estimation device is configured to provide channel information based on training sequences components in the baseband signals.

5. The apparatus of claim 2 wherein the communication burst is time multiplexed with a training sequence in appropriate assigned time slots and codes.

6. The apparatus of claim 5 wherein the communication burst includes:
   a midamble;
   a guard period; and
   two data fields.

7. The apparatus of claim 6 wherein the midamble is between the two data fields.

8. The apparatus of claim 6 wherein the guard period separates the communication burst from a next communication burst.

9. The apparatus of claim 6 wherein the two data fields are the same length.

10. The apparatus of claim 2 wherein the communication burst is an almost continuous global pilot.

11. The apparatus of claim 2 wherein the modulator is configured to use direct phase shift keying (DPSK).

12. The apparatus of claim 2 wherein the modulator is configured to use quadrature phase shift keying (QPSK).

13. The apparatus of claim 2 wherein the modulator is configured to use M-ary quadrature amplitude modulation (QAM).

* * * * *

UNITED STATES PATENT AND TRADEMARK OFFICE
CERTIFICATE OF CORRECTION

PATENT NO. : 7,463,694 B2
APPLICATION NO. : 11/897456
DATED : December 9, 2008
INVENTOR(S) : Kwak et al.

It is certified that error appears in the above-identified patent and that said Letters Patent is hereby corrected as shown below:

IN THE SPECIFICATION

At column 4, delete Equation 5, and insert therefor

-- $b^{(k,p)} = (b_1^{(k,p)} b_2^{(k,p)} \ldots b_{Q+w-1}^{(k,p)})T \equiv h^{(k,p)} \otimes c^{(k)}$ ,--.

At column 5, delete Equation 12, and insert therefor

-- $$d = ({d^{(1)}}^T \; {d^{(2)}}^T \ldots {d^{(K)}}^T)^T$$
$$= (d_1 \; d_2 \; \ldots \; d_{KN})^T$$ --.

At column 6, line 66, after the word "symbols", delete "$R_d E\{dd^H\} = I$" and insert therefor --$R_d = E\{dd^H\} = I$--.

At column 8, delete Equation 33 and insert therefor

-- $\Phi_g^{(i)} \equiv A_g^{(i)} ({A_g^{(i)}}^H A_g^{(i)})^{-1} {A_g^{(i)}}^H$ --.

At column 9, line 2, before the words "is a new", delete " $\tilde{r}^{g(2,p)}$ " and insert therefor -- $\tilde{r}^{g(2,p)}$ --.

Signed and Sealed this
Eleventh Day of October, 2011

David J. Kappos
*Director of the United States Patent and Trademark Office*

CERTIFICATE OF CORRECTION (continued)
U.S. Pat. No. 7,463,694 B2

At column 9, line 28, after the words "consists of" delete " $\tilde{r}^{(i,p)}$ " and insert therefor -- $\tilde{r}_g^{(i,p)}$ --.

At column 9, line 36, before the words "are produced" delete " $\hat{d}_{g,hard(i)}$ " and insert therefor -- $\hat{d}_{g,hard}^{(i)}$ --.

At column 11, line 16, after the word "vector" delete " $\tilde{r}_g^{(1,1)}$ to $\tilde{r}^{(1,P)}$ " and insert therefor -- $\tilde{r}_g^{(1,1)}$ to $\tilde{r}_g^{(1,P)}$ --.

At column 11, line 30, before ", for each" delete " $\tilde{r}^{(2,P)}$ " and insert therefor -- $\tilde{r}_g^{(2,P)}$ --.

At column 11, line 41, before ", from the" delete " $\hat{r}^{(2,P)}$ " and insert therefor -- $\hat{r}_g^{(2,P)}$ --.

At column 11, line 41, after "vectors," delete " $\tilde{r}_g^{(2,1)}$ to $\hat{r}_g^{(2,P)}$ " and insert therefor -- $\tilde{r}_g^{(2,1)}$ to $\tilde{r}_g^{(2,P)}$ ,--.

At column 11, line 42, after "vector," delete " $\tilde{r}_g^{(3,1)}$ to $\tilde{r}^{(3,P)}$ " and insert therefor -- $\tilde{r}_g^{(3,1)}$ to $\tilde{r}_g^{(3,P)}$ ,--.